April 23, 1929.   A. J. SWEENEY   1,710,438
APPARATUS FOR REFRIGERATING BY ABSORPTION
Filed Aug. 24, 1926
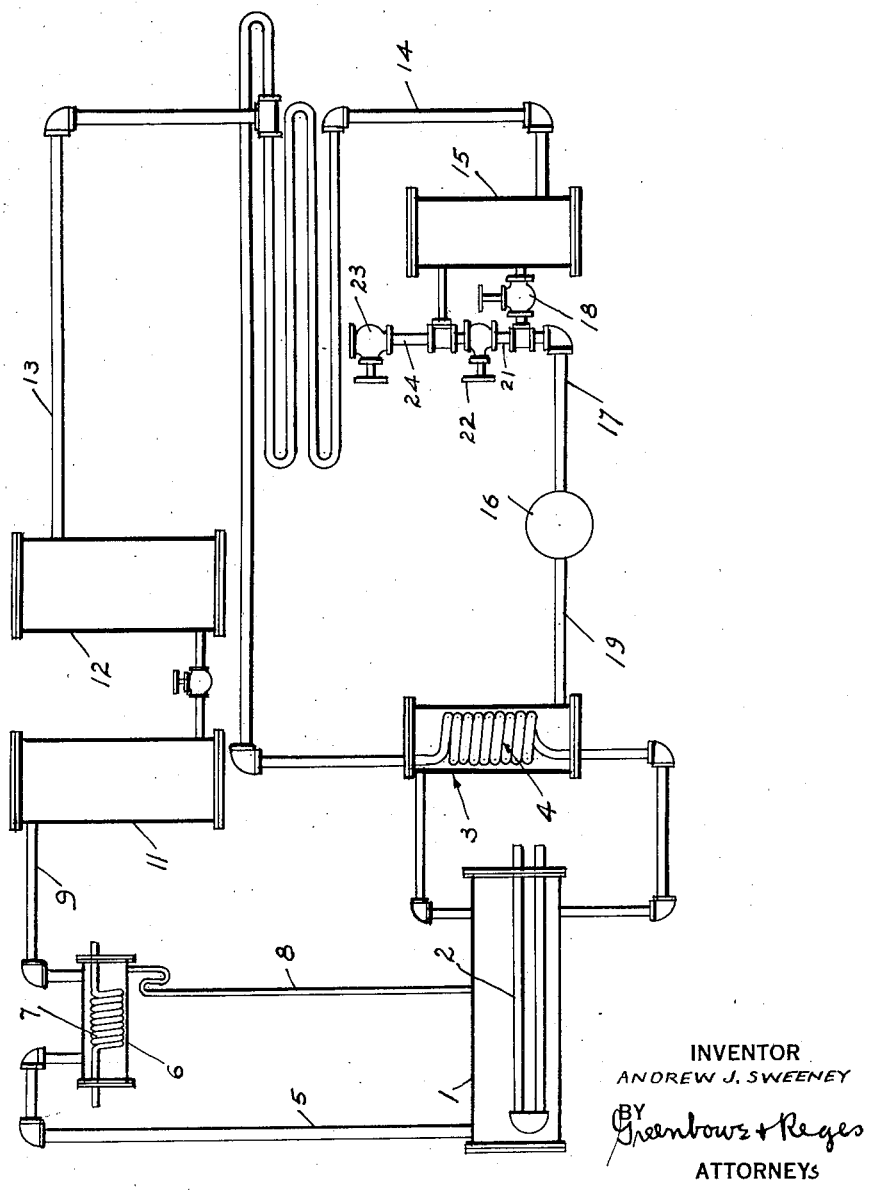
INVENTOR
ANDREW J. SWEENEY
BY Greenbowz + Reges
ATTORNEYS

Patented Apr. 23, 1929.

1,710,438

UNITED STATES PATENT OFFICE.

ANDREW J. SWEENEY, OF BAYONNE, NEW JERSEY.

APPARATUS FOR REFRIGERATING BY ABSORPTION.

Application filed August 24, 1926. Serial No. 131,175.

This invention relates to an improvement in refrigerating apparatus of the absorption type and to an improved method of refrigeration.

An object of my invention is to provide a refrigerating apparatus of the absorption type which has an increased capacity and is effective in saving ammonia.

Another object of my invention is to provide an improved method of refrigeration by absorption whereby an increased economy may be secured.

A more specific object of my invention is to provide an obsorption refrigerating apparatus which is adapted to separate from certain non-absorbable gases the ammonia contained therein and recover the same for further use.

Other objects of my invention will become apparent from a reading of the following specification.

In refrigeration apparatus of the absorption type as at present employed there is a certain amount of non-absorbable gases that collect in the absorber or the liquor receiver connected to the absorber. It has been the practise heretofore to discharge such gases from the low pressure side of the refrigerating system in order to keep the pressure low enough to allow the anhydrous ammonia to expand in the cooler. In so doing the ammonia contained therein is also discharged for the reason the low pressure prevailing in this part of the system does not permit the ammonia to separate out. It has been my discovery that if these non-absorbable gases are removed from the low pressure side of the system to the high pressure side that the ammonia separates from these non-absorbable gases and thus an economy may be effected as well as the efficiency increased. At the same time these non-absorbable gases can be more effectively removed from the apparatus.

Broadly stated my invention comprises the combination with the usual refrigeration apparatus of means, preferably a pump of the rotary type such as disclosed in my copending application Serial Number 131,174, filed August 24, 1926, which is adapted to remove the non-absorbable gases from the low pressure side of the system to the high pressure side.

In order that the invention may be better understood, reference may be made to the accompanying drawing in which the single figure diagrammatically illustrates a suitable arrangement of absorption apparatus embodying the improvement made by me.

Referring to the drawing, the usual absorption apparatus is illustrated as comprising a generator 1 of any suitable type, having steam coils 2 or other means by which the aqua-ammonia or other refrigerant is distilled. Mounted adjacent to the generator 1, is a cylinder tower 3 known in the trade as an exchanger, and through which the ammonia liquor circulates through a coil 4. Connected by a pipe 5 to the generator, is a dehydrator 6 having cooling coils 7 therein for dehydrating the hot gas from the generator. Any water separated from the dehydrator may flow back into the generator through the pipe 8 which connects the two devices. Leading from the dehydrator is a pipe 9 which connects with any well known form of condenser 11 containing the usual water coils (not shown). In the condenser the dry gas is condensed being under pressure, as will be understood. Connected to the condenser is a cooler 12 containing coils (not shown) through which a brine solution may be circulated whereby the anhydrous ammonia is expanded for cooling the brine solution. Connected by a pipe 13 with the cooler is the usual absorber in which the gases from the cooler and weak liquor from the generator become mixed. The absorber may be one of the many kinds used in this particular type of refrigerating apparatus, such absorbers usually comprising a plurality of coils. The absorber is connected by a pipe 14 to a receiver 15 in which the low pressure ammonia collects together with a great amount of non-absorbable gases which contain a certain amount of ammonia. Unless these gases are removed from the receiver 15, the pressure in the system particularly in the cooler, becomes so great that the ammonia cannot freely expand, which causes an inefficient operation of the system together with considerable loss of ammonia.

As explained previously, it has been the practice to discharge the accumulated gases in the receiver directly into the atmosphere or into a waste pipe or tank where it is lost. My improvement consists in transferring such gases to the high pressure side of the system and thereby cause the separation of the ammonia from the gases to take place.

To secure the desired operation, I provide in the above-described system one or more pumps which are capable of removing these gases to the desired portion of the system. For illustrative purposes I have only shown one pump 16 which is capable of not only removing the ammonia but also adapted to remove the gases from the receiver 15 to the high pressure side of the system, as for example to the exchanger which is located in that side of the system.

This pump 16 may be connected on the one side by a pipe 17 through a valve 18 with the lower portion of the receiver 15 in which the ammonia collects. On the other side the pump 16 is connected by a pipe 19 with the exchanger 3. Also connected to the pipe 17 is a pipe 21 having a valve 22, said pipe being connected to the upper portion of the receiver in which the gases accumulate. A valve 23 is shown connected by a pipe 24 to the pipe 21. If desired a gas pump (not shown) may be connected to the valve and to the generator 1 or the condenser 11, so as to force these gases in the receiver to the high pressure side of the system. It is to be understood if a gas pump is connected to the valve 23, that the pump 16 need only be a liquid pump, although a combined liquid and gas pump may be used instead in which event the valve 23 is closed and the valve 22 opened. If two pumps are employed the valve 23 is opened and the valve 22 closed, whereby the gas pump serves to remove the gases and the liquid pump the liquid from the receiver.

It will be apparent from the foregoing description that by continually pumping the gases from the receiver or low pressure side of the system to the high pressure side a constant low pressure is maintained in the absorber and cooler, thus giving the same capacity at a lower temperature or increasing the capacity at the same temperature.

Modifications of the invention may be made by those skilled in the art, but such modifications are contemplated by me which come within the spirit and scope of the invention as defined by the appended claim.

What is claimed is:

In an absorption refrigerating apparatus, the combination with a generator, a condenser, and an evaporator, of a receiver for collecting non-absorbable gases and a pump having connections adjacent the top and also adjacent the bottom of said receiver and to the generator side of the apparatus, whereby the ammonia and non-absorbable gases collected in the receiver may be removed from the low pressure side of the apparatus to the high pressure side thereof.

In testimony whereof I affix my signature.

ANDREW J. SWEENEY.